C. MILLAR.
AUTOMOBILE SIGNAL.
APPLICATION FILED SEPT. 26, 1919.
1,349,289.
Patented Aug. 10, 1920.
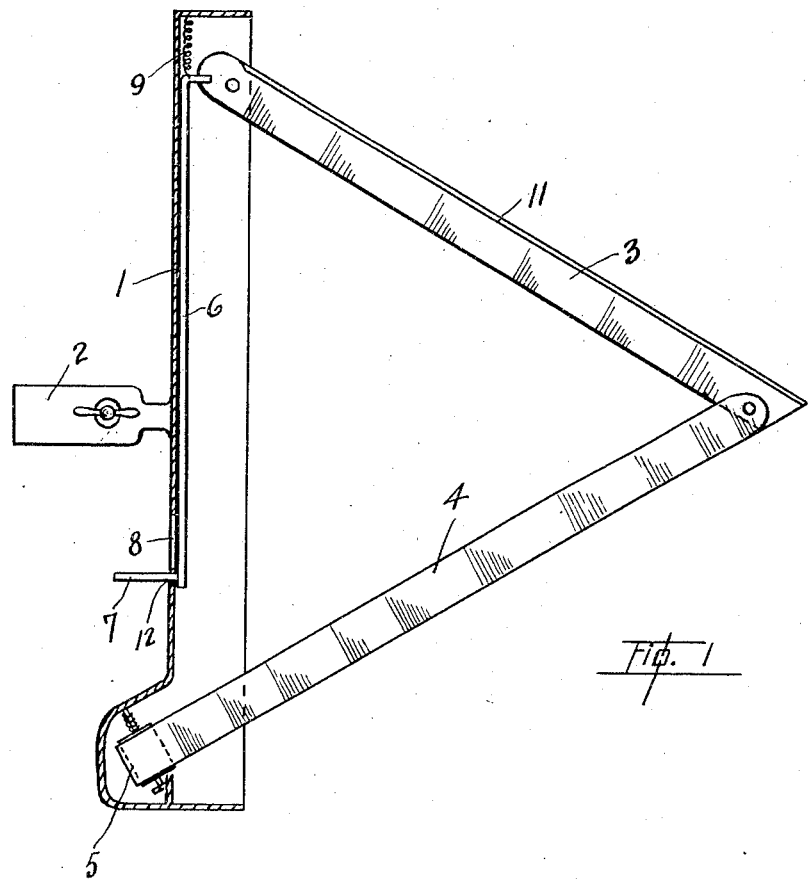
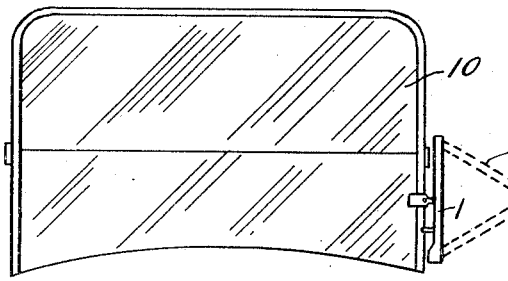
INVENTOR
Charles Millar
BY
ATTYS.

UNITED STATES PATENT OFFICE.

CHARLES MILLAR, OF VANCOUVER, BRITISH COLUMBIA, CANADA.

AUTOMOBILE-SIGNAL.

1,349,289.   Specification of Letters Patent.   Patented Aug. 10, 1920.

Application filed September 26, 1919. Serial No. 326,601.

*To all whom it may concern:*

Be it known that I, CHARLES MILLAR, a subject of the King of Great Britain, and a resident of the city of Vancouver, in the Province of British Columbia, Canada, have invented certain new and useful improvements in Automobile-Signals, of which the following is a specification.

My invention relates to improvements in signals used on automobiles and other moving vehicles to indicate the direction planned by the driver to take so as to give warning to those ahead or to the rear, or at intersections or bends or turns in streets or highways to avoid collision and danger, and the object of my invention is to provide a device of this nature which may be readily attached to an automobile so as to be easily observed from both front and back, which is operated with great convenience and facility, and which is simple in construction and capable of being manufactured and sold at a low cost.

I attain this object by the construction illustrated in the accompanying drawings in which—

Figure 1 is a side view of the device, in part section.

Fig. 2 is a view illustrating the practical application of the invention.

Similar figures of reference indicate similar parts throughout the views.

1 indicates a rectangular box-like casing provided with a clamp member 2 by means of which it may be detachably connected to the windshield of an automobile and having one side open as shown in Fig. 1. 3, indicates an arm of thin rigid metal turned over on one edge as at 11 to stiffen it, and pivotally connected adjacent its upper end between the walls of the casing near the upper end of the same, to the free end of which arm is connected a flexible steel tape-like member 4 the opposite end of which is secured to and normally wound on a spring roller 5 mounted adjacent the lower end of the casing. A rod 6 within the casing is connected to the upper end of the arm 3 as shown, the lower end of which rod is provided with a handle 7 which projects through a slot 8 in the wall of the casing, and between the upper end of the rod 6 and the upper end wall of the casing 1 is disposed a spring 9, all as shown in Fig. 1. At the lower end of the slot a notch 12 is provided to receive the handle when the device is extended to signaling position.

The device is clamped to the edge of the windshield, indicated by the numeral 10 in Fig. 2 and when not in use the arm 3 lies vertically between the walls of the casing with the turned edge 11 closing the open side thereof, the tape 4 being then wound on the roller 5 and the handle 7 being at the upper end of the slot. On approaching an intersection or turn the driver pulls down the handle and seats it in the notch 12 to hold it temporarily in position, thus swinging the arm 3 outwardly, so that the device assumes the form of a triangle the apex of which points in the direction the automobile is turning, and when painted say, a bright red color, presents a very prominent signal and one readily seen not only from the front but also from the rear of the car on account of the distance it projects out therefrom. After the car has turned the handle is disengaged from the notch 12 whereupon the combined action of the spring 9 and of the spring roller will rewind the tape on the roller, thus drawing the arm 3 down into its normal position within the casing. It will of course be understood that there are two such devices used, one on each side of the windshield so that right or left hand turns may be signaled.

From the foregoing it will be seen that I have devised a simple, inexpensive, and highly practical automobile signal.

What I claim as my invention is:—

1. An automobile signal comprising a substantially rectangular casing open on one side and having a slot in the opposite side, said casing being provided with a clamp whereby it may be detachably connected vertically to the side of the automobile windshield, a signaling arm pivotally connected between the walls of said casing adjacent its upper end and arranged to hang normally vertical, said arm being formed out of a thin metal strip turned over on its edge to form a flange adapted to close the open side of the casing, a spring-roller rotatably mounted adjacent the lower end of the casing, a tape member wound on said roller having its free end secured to the free end of said arm and adapted to be unwound by the raising of the same, whereby the arm and the tape when extended form the sides and the casing the base of a triangle, the apex of which points outwardly, and a rod secured at its upper end to the said arm having its lower end bent and extended through the casing slot for the operation of the arm.

2. A signal comprising a casing, a normally vertical signal arm having its upper end pivotally secured within the upper portion of the casing and its lower end free to swing outwardly from said casing, a spring roller secured in the lower portion of the casing having a tape member wound thereon, the free end of the tape member being secured to the free end of the arm, and a vertically disposed operating member mounted for reciprocating movement within the casing and having its upper end secured to the pivoted end of the signal arm whereby movement of the operating member in one direction will swing the lower end of the signal arm outwardly from the casing.

Dated at Vancouver, B. C., this 12th day of Sept., 1919.

CHARLES MILLAR.